H. A. LOTHROP.
Hoe.
No. 18,979.
Patented Dec. 29. 1857.
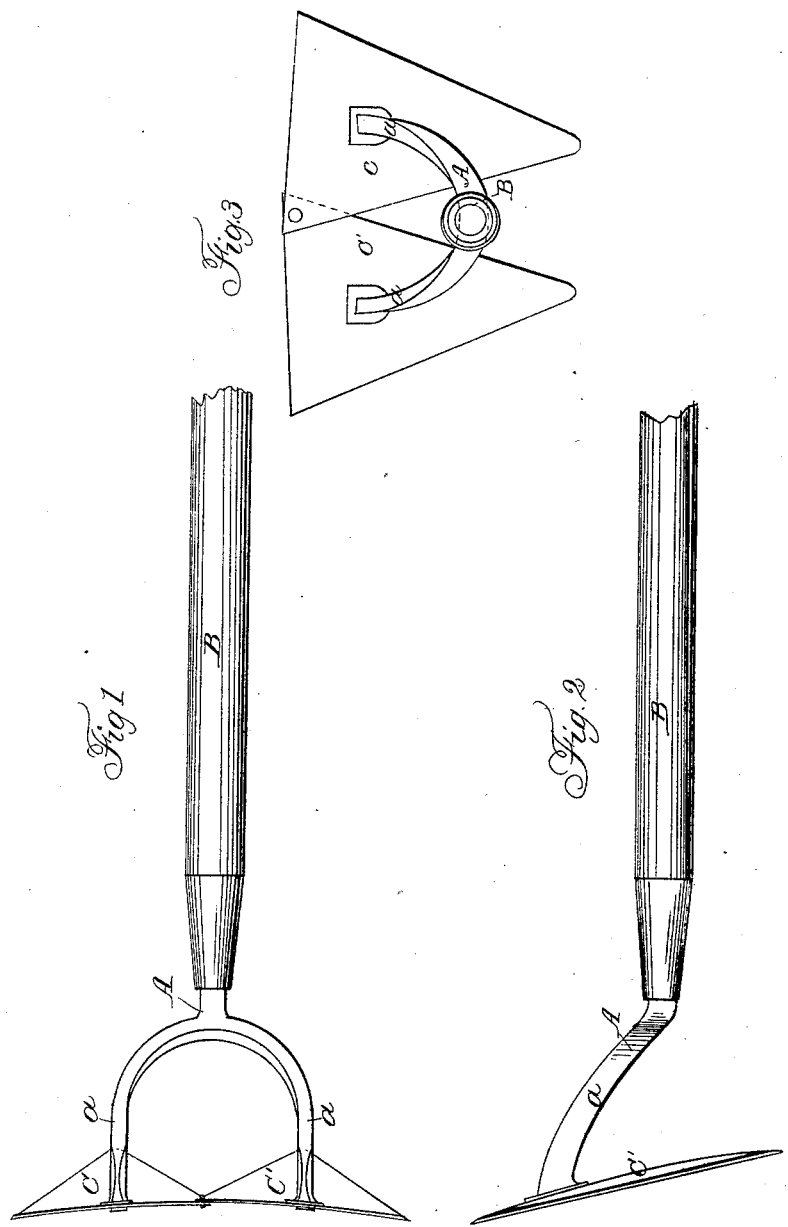

UNITED STATES PATENT OFFICE.

HORACE A. LOTHROP, OF SHARON, MASSACHUSETTS.

IMPROVEMENT IN HOES.

Specification forming part of Letters Patent No. 18,979, dated December 29, 1857.

*To all whom it may concern:*

Be it known that I, HORACE A. LOTHROP, of Sharon, in the county of Norfolk and State of Massachusetts, have invented a new or Improved Agricultural Implement for Hoeing Land; and I do hereby declare that the same is fully described and represented in the following specification and the accompanying drawings, of which—

Figure 1 exhibits a top view, Fig. 2 a side elevation, and Fig. 3 a front end view, of such implement.

In these drawings, A denotes a bifurcated metallic shank, inserted in and projecting from a wooden handle, B. To each prong $a\ a$ of the bifurcated shank A there is affixed a triangular hoe-blade, C or C', each of said blades being arranged with respect to the handle and one another, as shown in the drawings. The two blades are exhibited as overlapping one another at their inner corners. When so overlapped they may be left unconnected, or they may be either brazed or riveted together, each blade supported by a separate prong of the furcated shank and being formed as an isosceles triangle. A hoe may be made in this manner of three or more separate triangular blades, they being attached to and supported respectively by the prongs of a furcated shank. In this way a very useful agricultural implement may be made from small pieces of saw-plate.

Now, I do not claim a hoe made with a single triangular blade; nor do I do claim one as made of a single blade having two opposite parallel edges and a triangular notch whose opposite side and the parallel edges of the hoe-plate form boundaries of two teeth extending from the plate; but What I do claim is—

An improved manufacture of hoe, as described, or one having its blade composed of two or more separate isosceles triangular plates or teeth, each being lapped on or connected to that next to it at their two corners, and each being supported by a separate prong of a furcated shank, as hereinbefore described.

In testimony whereof I have hereunto set my signature.

HORACE A. LOTHROP.

Witnesses:
  JOHN R. PACKARD,
  B. B. McNEAL.